Oct. 4, 1949.                    W. D. MACGEORGE                    2,484,000
                              PROPORTIONAL CONTROL SYSTEM
Filed June 18, 1948                                              2 Sheets-Sheet 1

INVENTOR.
WILLIAM D. MACGEORGE
BY
Barr, Borden & Fye
ATTORNEYS

Oct. 4, 1949.  W. D. MACGEORGE  2,484,000
PROPORTIONAL CONTROL SYSTEM

Filed June 18, 1948  2 Sheets-Sheet 2

*INVENTOR.*
WILLIAM D. MACGEORGE

*ATTORNEY*

Patented Oct. 4, 1949

2,484,000

UNITED STATES PATENT OFFICE 2,484,000

PROPORTIONAL CONTROL SYSTEM

William D. Macgeorge, Havertown, Pa., assignor to Automatic Temperature Control Co., Inc., Philadelphia, Pa., a corporation of Pennsylvania Application June 18, 1948, Serial No. 33,794

14 Claims. (Cl. 137—153)

This invention relates to proportional control systems.

Proportional control systems of the prior art, so far as known, have certain disadvantages which militated against their use except under certain extremely favorable conditions. They are delicate instruments which cannot stand up against vibration for more than a short time, they do not have available any means for securing full use of the available force for securing a controlling function in response to a deviation of the controlled condition, they are cumbersome and complex, as they usually incorporate make and break contacts, and they are unduly expensive.

It is among the objects of this invention to simplify and cheapen the cost of proportional control systems; to make a proportional control system of ruggedness and power; to obviate the defects of the prior art control systems; to provide a proportional control system which combines in function and effect without the structure a pressure controller, valve operator and valve positioner; to provide a proportional control system operated in its entirety by fluid pressures only and which thus avoids the fire hazards sometimes associated with electrical proportional controls; to provide a proportional control system which is substantially immune to vibration; to provide a proportional control system having a wide range of facile adjustability; and other objects and advantages will become more apparent as the description proceeds.

In the accompanying drawings forming part of this description:

Figure 1:
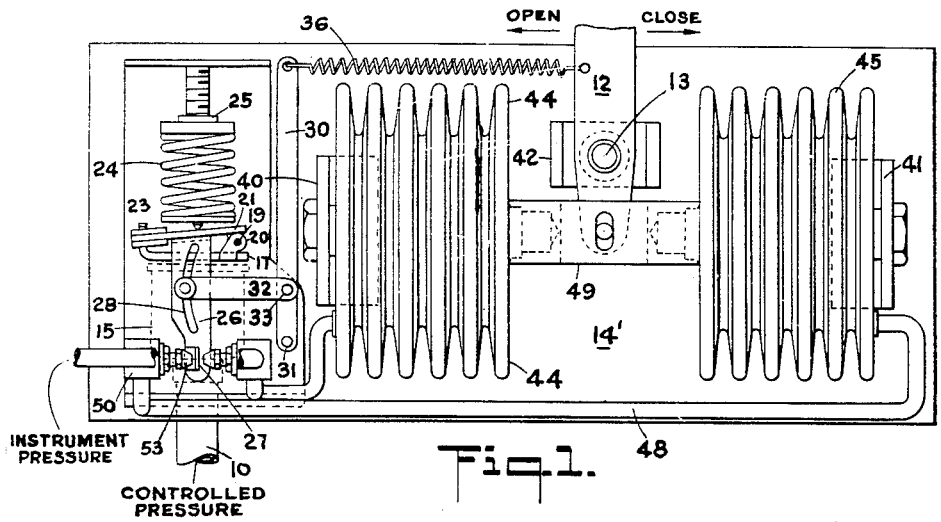
Fig. 1 represents a fragmentary plan of an illustrative embodiment of the invention with all of the parts shown in an illustrative mid position of balance and with the valve-operating lever in a mid position at which the valve is substantially one-half open.
Figure 2:
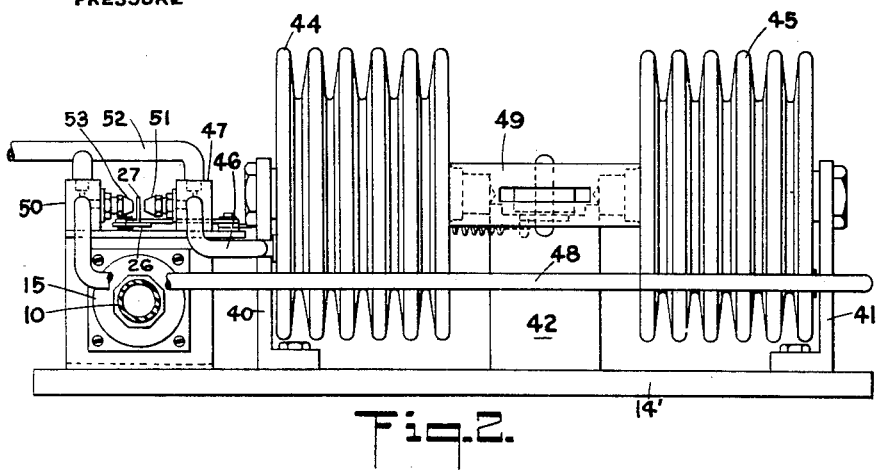
Fig. 2 represents a fragmentary elevation of the same.
Figure 3:
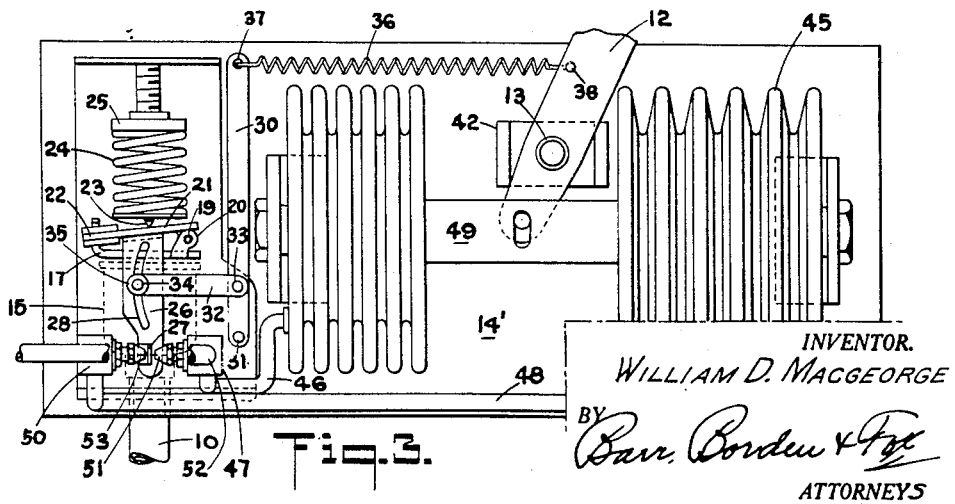
Fig. 3 represents a fragmentary plan similar to that of Fig. 1, except that the valve control arm is in an extreme position consonant with an extreme valve positioning.

In both forms of the device disclosed, the pipe 10 is one on which the pressure to be controlled is incident, which illustratively may be designated as a steam pressure line controlled by a valve of any desired common construction (not shown) in which line the pressure is required to be maintained at a given predetermined constant, so as to furnish a predetermined steam supply, for instance, from a supply line in which the pressure for one reason or another may fluctuate, and which fluctuation must be corrected to maintain the predeterminedly proper supply. Illustratively, it may be assumed that the entire assembly is carried by a Diesel-engined locomotive carrying a steam boiler as a source of heat for the cars of the train drawn by the locomotive. Illustratively, it may be further assumed that 200 p. s. i. is the proper predetermined pressure to maintain a proper temperature in the cars. In the actual illustrative case this may be predetermined between 100 p. s. i. and 250 p. s. i., according to demands in the illustrative use indicated. A connection from this steam line has a terminal in the pipe 10. The conventional valve by its variation in opening controls the supply of steam to the line 10 and to the cars. It will, of course, be recognized that the illustration of use is purely typical and the control disclosed is applicable to any source of fluid flow or pressure and to any range of pressure that requires such control.

A valve-operating lever 12 is pivoted at 13 to a mounting base 14', and has a link or other connection (not shown) extending from its free end to the conventional valve. The position of the free end of the lever in space determines the setting of such valve. Illustratively, in Fig. 1, as noted, with the lever 12 in the mid position, the valve is also preferably at mid position of setting, although this may depend upon the flow control curve of the particular valve.

The pipe or conduit 10 in both forms of the invention is connected to a bellows or like expansible chamber 14 mounted and sealed within a tubular housing 15, in spaced relation thereto so as to define an expansion chamber 16, closed by the flange element 17 and the latter is apertured in the center to permit the free axial passage of the axial pressure-finger or pointer 18. This constitutes a control bellows.

In the form of device shown in Figs. 1 to 4, the flange 17 carries spaced ears 20 in vertical alignment on which the compound lever 21 is pivoted, as at 19 at one side transversely of the bellows and housing. The compound lever 21 comprises a generally vertical web or plate 22, parallel to the axis 19 on which it is pivoted, which has its inner face juxtaposed to the end of the pressure finger 18. The outer face of the web 22 is abutted by the biased pressure-finger element 23, the rear end of which is engaged by the adjustable compression spring 24. Spring 24 is compressed variably between the pressure-finger element 23 and a screw-threaded follower 25, by which latter the spring loading of spring 24 is readily adjusted. The compound lever 21 includes the integral or rigidly attached horizontally disposed slotted plate or extension 26, lying in a plane generally normal to the axis 19. The slotted plate or extension 26 carries at its free end the upstanding generally planar baffle element or jet throttle 27, normal to the plate 26, and the latter swings in a horizontal arc as the web and plate swing on the axis 19. The plate 26 is provided with a substantially arcuate slot 28 generally longitudinal of the plate. A throttling range linkage is provided, comprising a lever 30, pivoted at 31 to a fixed portion of the frame or housing, and pivotally engaged by one end of a link 32, pivoted at 33 toward one end on the lever 30. The other end of the link 32 carries the depending pin 34, adjustably positioned in the slot 28 of the plate 26, by means of an adjustment element 35. The last mentioned end of the link is adjustable substantially longitudinally of the plate 26 in slot 28 relative to the pivot 19, so as to vary the effectiveness of the leverage of lever 30 on lever 21. A throttling range tension spring 36 extends from one anchor point 37 toward or at the free end of the lever 30, to the other anchor point 38 on the valve lever 12. The anchor points may be selected from respective series of spaced points on either lever (not shown) in order to predetermine the effectiveness of the spring 36, while maintaining the relation of the link 32 to the slotted plate 26.

In order to control the attitude and movements of the valve control lever 12, a pair of bellows-supporting brackets 40 and 41, respectively, are mounted on the base 14', evenly spaced longitudinally of the frame 14', on each side of a central bracket 42, upon which latter by pivot pin 13 the valve operating lever is pivotally mounted. A first power bellows 44 or the like has one end anchored to the bracket 40 and the free end of the bellows is attached to or bears against the cross link 49, under, preferably, an initial compressive tension. A second power bellows 45 or the like is mounted by one anchored end to the bracket 41, and has its free end connected to or bearing against the opposite end of the cross link 49, and is also preferably initially under the same compressive tension as bellows 44. In other words, each bellows is so formed or fitted as to be biased toward expansion, in the preferred form. These power bellows or the like expansive units are common to both forms of the invention.

In the embodiment of the invention disclosed in Fig. 1, etc., a control pressure conduit 46 extends into the bellows 44 from a control source or head 47, while a complemental pressure control conduit 48 extends from bellows 45 to a control source or head 50. Head 47 has a laterally projecting jet or bleed mouth or nozzle 51 communicating with the pressure control line 46 and also with an incoming pressure line 52, which latter is in permanent communication with a source of fluid pressure which is substantially constant (not shown), furnishing what may be designated as instrument pressure, which may, illustratively, be of the order of 20 p. s. i. The jet mouth or nozzle 51 is disposed in juxtaposition to the baffle or vane element 27 on one side thereof. The head 50, which is also in continuous communication with the same source of instrument pressure by the conduit 52, is also provided with a bleed jet or mouth or nozzle 53, in communication with the pressure line or conduit 48, and is juxtaposed to the baffle or vane element 27 on the other side thereof from the jet or nozzle 51. It will be clear that when the baffle element 27 is disposed exactly in the middle between the opposed jets or nozzles 51 and 53, the rate of bleed from each jet will be identical and therefore the pressures in lines 46 and 48 and in bellows 44 and 45 will be identical. With the exception of the effect of the initial resilience built in or associated with the respective power bellows, it will be seen that with equal internal pressures, the bellows would return to equal conditions of expansion, but that the initial bias permits the power bellows to substantially hold the relative conditions of expansion or contraction to which differential pressures therein will cause them to differentially respond, as will be pointed out.

Let it be assumed that from any position of the parts, say, illustratively, from the position shown in Fig. 1, there is a change in the pressure of the line communicating with pipe 10, so that a change in the setting of the associated valve is necessary in order to reestablish the predetermined desired normal pressure. For a typical example, let it be assumed that the purely illustrative initial 200 pound pressure increases, so that it is desired to slightly close the associated valve. The increased pressure in the control bellows increased the clockwise pressure on the plate 22 of compound lever 21 from the pressure finger 18, which then preponderates over the counterclockwise bias of the compression spring 24 plus the counterclockwise pressure on the lever plate 26 from lever 30 by reason of the loading of the spring 36. This immediately moves the lever 21 clockwise to move the baffle element 27 a slight distance toward nozzle 53 to reduce the bleed rate therefrom, and away from nozzle 51, the bleed rate of which increases. This increases the pressure in the line 48 and in the power bellows 45, which expands and simultaneously partially vents or reduces the pressure in line 46 and power bellows 44, which contracts, so that the intermediate link 49 moves to the left toward the position of the parts in Fig. 3, swinging the rear end of valve lever 12 in such manner that the outer valve-coupled free end thereof moves to the right, thus moving the supply valve toward closing.

As the movement of the valve lever 12 has been accompanied by the increased loading of the throttling range spring 36, the initial wide differential between the pressures in the two respective bellows caused by the initial clockwise swing of the baffle-carrying lever 21 is gradually reduced as the spring 36 through the linkage gradually exerts such pull on the lever 21 that it moves slightly counterclockwise until the baffle 27 is pulled slightly away from the original disposition close to jet 53 and spaced from jet 51. This, as will be clear, reduces the pressure effective on bellows 45 while simultaneously increasing the pressure on bellows 44, and when the differential between the pressures has been reduced to a point almost of disappearance, depending upon the bias on the respective bellows, the arm 12 will come to rest and will remain at rest in the new position of adjustment until a further change takes place in the pressure to be controlled, manifested in the port 10. If the pressure should drop in the port comprised of pipe 10, so that opening of the valve is necessary, the reverse of the above action takes place. In this latter case the movement of the valve lever toward opening of the coupled valve will be accompanied by an unloading of the throttling range spring so that it imposes progressively less and less bias on the lever 21, so that the initial counterclockwise motion of the lever 21 moving the baffle 27 toward the jet 51 and away from jet 53, causing higher pressure in the bellows 44 than in the bellows 45, is followed by reduction of the bias imposed by the throttling spring on the lever 21. This reduction in bias increases until a small clockwise torque is developed, from the decrease of the total bias from springs 24 and 36 opposing the thrust of the control bellows, which moves the baffle 27 slightly away from the jet 51 and toward the jet 53, to gradually reduce the differential between pressures in the power bellows until, with the bellows at almost the same internal pressures, balance will be attained and the lever 12 will occupy a new adjusted position with the valve moved toward open by the valve lever 12.

Reference has been made to the fact that the bellows are typical expansion elements, of added utility because of the ease with which a bias can be associated with them if desired. It will be clear and should be understood that any other desired expansion devices can be used in lieu of the biased bellows. Thus, unbiased bellows, pistons, or diaphragm or like devices can be used. The only difference between such alternative expansion devices and the biased bellows or the like of the instant invention, lies in the fact that owing to the bias of the preferred form of expansible element, balance in the attitudes or conditions of the power expansion devices occurs, without actual equality of pressures in the opposing devices. Thus, with the biased bellows actual balance can occur, in a purely illustrative case, with, say, ten pounds of instrument air on one bellows and with nine and one-half pounds of air on the other bellows. On the other hand, without the interposed bias, it will be understood that with unbiased pistons or diaphragms or bellows or the like, actual balance occurs any time that the actual pressure in one expansible unit is exactly equal to that in the other. This means that the throttling range spring must function to bring the flapper exactly back to symmetry between jets to secure the equal pressures necessary for balance with the unstressed or unbiased expansion devices, in contrast to the quicker balance accomplished by the preferred form of biased expansible devices illustrated herein, in which the baffle or vane is always slightly asymmetrical between the jets with a slight differential between the pressures internally of the expansible devices, unless everything is in mid-position, at which the vane or baffle is symmetrical between the jets. It is to be understood, therefore, that within the broad scope of the invention, while biased bellows are preferred, they may comprise any other type of power units responsive to the input of differential pressures to move the valve lever, and to vary the loading of the throttling range spring and linkage assembly, in either or both forms of the invention disclosed herein. The above specific description relates to a control operation secured by unbalancing two jets. It will be seen that a similar but even better control can be secured from a single jet, using an air relay as shown, for instance, in Fig. 5, with the selected opposing expansible elements.

Figure 5:
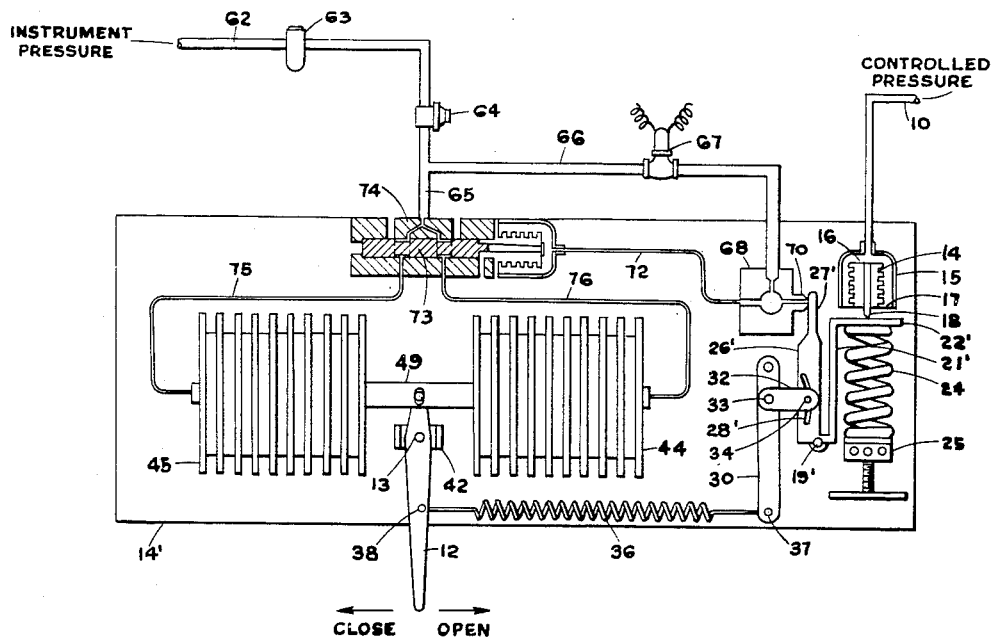
Fig. 5 represents a schematic diagram of a modified form of proportional control system.
Figure 4:
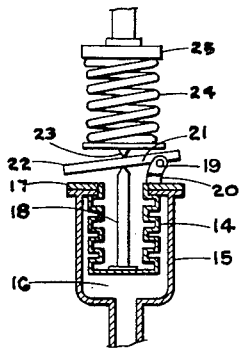
Fig. 4 represents a fragmentary section of the pressure-responsive control unit.

In Fig. 5, all of the parts which are identical with the disclosures of the earlier figures are given identical reference characters. A supply of instrument air pressure is provided through a conduit 62, and passing through a filter device 63 and a reduction valve 64 splits into two lines 65 and 66. Line 66 contains a solenoid-operated valve 67, which closes when the circuit therethrough is open, and leads to a distributing head 68. The head 68 is internally constricted to form an orifice 69 leading to a single jet orifice 70, and also by a line 72 to a control valve-actuating expansion chamber 71 of an air relay. The control expansion chamber 71 controls the axial positioning of the slide element 73 in the valve housing 74, to which the other supply line 65 leads. The power bellows 45 leads through conduit 75 to one end of the valve 74, while power bellows 44 leads through a similar conduit 76 to the other end of the valve. The lever 30, link 32 are provided together with the same throttling range spring 36, but in the specific illustration of Fig. 5, for simplicity a bell crank lever is provided having the slotted plate 26' with a slot 28' therein, and the free end of which forms a vertical baffle 27'. The bell crank is pivoted at 19' and has a leg 21' carrying a foot 22' in position to be engaged by the compression spring 24 on one face and the pressure finger 18 of the control bellows on the other.

With the device disclosed schematically in Fig. 5, increase of steam pressure on line 10 compresses the steam bellows 14 and rotates the nozzle baffle 27' clockwise, allowing the uncovered nozzle opening or jet 70 to freely vent the air in the instrument air line. As the air escapes from the nozzle 70 faster than it can be supplied through reduced internal orifice 69 the pressure on the air relay bellows 71 is reduced. This moves the piston to the right and moves the slide element 73 of the valve to the right, allowing air from line 65 to flow into bellows 45, and the air in bellows 44 to flow out through the air vent provided by the valve. The resulting pressure differential causes the valve operating lever 12 to move toward the "closed" position. As the above takes place, the movement of the valve lever 12 stretches the throttling range spring 36 until the load it exerts on the throttling range lever system overcomes the load on this system caused by the increase of steam pressure and the nozzle baffle 27' moves counter-clockwise to its original position. This restores the pressure on the air relay bellows 71 and its piston and associated slide element returns to its neutral holding position at which air neither enters nor leaves the operating or power bellows and the system comes to rest. In this case, actual locking of both bellows in the conditions of relative expansion to which they have moved, takes place. The converse of this cycle follows decrease in steam pressure on line 10.

It is preferred to provide the solenoid air valve 67 in the instrument line which must be kept continuously energized for the system for normal operation. When deenergized for any reason, this enables the air valve or control bellows 71 to move to its extreme right-hand setting, under its relative collapse, and place the left-hand bellows 45 under full instrument air pressure, with zero pressure on the complemental bellows 44, and moves the controlled steam valve to its fully closed position.

In the event of variation of the supply pressure of the instrument air, which is normally preferred to be between fifteen pounds and twenty pounds, the variation does not affect the sensitivity, but does change the power output of the power bellows.

The throttling range linkage and spring simply reduce the effectiveness of pressure changes in pipe 10 to prevent violent movements of the controlling nozzle vane, in both forms of the invention, as will be clear.

The simplicity and efficiency of the invention are thought to be clear.

Having thus described my invention, I claim:

1. A proportioning control for a valve, which comprises a valve-actuating lever, a pair of pressure displaced members coupled in mutual opposition to the lever, means responsive in positioning to a variable, a fluid pressure control system in operative association with the means and with the respective members, and means in the control system operative upon fluctuation of the variable to be controlled to expose the members to respectively different pressures so as to move the valve-actuating lever.

2. A proportioning control for a valve which comprises a valve-actuating lever, a pair of pressure displaced members coupled in mutual opposition to the lever, means responsive in positioning to a variable, a fluid pressure control system in operative association with the means and with the respective bellows, means in the control system operative upon fluctuation of such variable to be controlled to expose the members to respectively different pressures so as to move the valve lever, and throttling means operative as a function of valve-actuating lever setting for reducing the control action effect on the fluid variable system of small variations in the pressure to be controlled.

3. A proportioning control comprising a support, a valve-actuating lever pivoted to the support, a pair of mutually opposing pressure displaced members each respectively engaging the support and said lever, a conduit arranged for operative association with a source of power fluid pressure, port means including a pressure displaceable element arranged for operative association with a fluid pressure variable, a nozzle control lever pivoted to the frame, nozzle means communicating with said conduit and juxtaposed to said nozzle control lever, means responsive to variations in power fluid pressure as controlled by movements of the nozzle control lever relative to the nozzle means for differentially energizing the respective expansible members to move said valve lever, said pressure displaceable element responsive to variations in the pressure in the port for adjusting the position of said nozzle control lever.

4. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of instrument pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, a pressure displaceable control member coupled to the port element and mounted for opposition to said bias, varying as a function of the pressure in the port element to control the attitude of said flapper lever and flapper relative to said nozzle means, and means responsive to the variations in power fluid pressure at the nozzle means for differentially energizing the respective connections to the respective expansible power elements to energize and move said lever.

5. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, a pressure displaceable control member coupled to the port element and mounted for opposition to said bias, varying as a function of the pressure in the port element to control the attitude of said flapper lever and flapper relative to said nozzle means, means responsive to the variations in power fluid pressure at the nozzle means for differentially energizing the respective connections to the respective expansible power elements to energize and move said lever, and both of said power expansible members being initially biased toward expansion so as to substantially retain the relative positions to which differential internal fluid pressures in the respective members causes them to move.

6. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, a pressure displaceable control member coupled to the port element responsive to the pressure therein and mounted for opposition to said bias, varying as a function of the pressure in the port element to control the attitude of said flapper lever and flapper relative to said nozzle means, means responsive to the variations in power fluid pressure at the nozzle means for differentially energizing the respective connections to the respective expansible power elements to energize and move said lever, and a throttling control linkage operatively coupled with the valve lever and the flapper lever to apply an additional variable bias on said flapper lever additive to said first mentioned bias and varying with the attitude of the valve-actuating lever.

7. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, a pressure displaceable control member communicating with and coupled to the port element and mounted for opposition to said bias, varying as a function of the variable pressure in the port element to control the attitude of said flapper lever and flapper relative to said nozzle means, and means responsive to the variations in power fluid pressure at the nozzle means for differentially energizing the respective connections to the respective expansible power elements to energize and move said lever, said nozzle means comprising a pair of complemental jets directed at opposite sides of the flapper element and each respectively coupled with the said respective connections to the respective expansible power members so that with asymmetrical disposition of the flapper between the complemental jets the pressure in one expansible power member is higher and the pressure in the other expansible power member is lower than the pressure in both power members when the flapper is symmetrically disposed between the complemental jets.

8. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, an expansible control member coupled to and communicating with the port element and mounted for opposition to said bias, varying as a function of the pressure in the port element to control the attitude of said flapper lever and flapper relative to said nozzle means, means responsive to the variations in power fluid pressure at the nozzle means for differentially energizing the respective connections to the respective expansible power elements to energize and move said lever, said responsive means comprising an air relay having an expansible member responsive to the internal power pressures as it is modified by the relation of the flapper to the nozzle means, and a valve actuated thereby and controlling selectively the power pressures passing to the respective power expansible members.

9. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, an expansible control member coupled to and communicating with the port element and mounted for opposition to said bias, varying as a function of the pressure in the port element to control the attitude of said flapper lever and flapper relative to said nozzle means, means responsive to the variations in power fluid pressure at the nozzle means for differentially energizing the respective connections to the respective expansible power elements to energize and move said lever, a throttling control linkage operatively coupled with the valve-actuating lever and the flapper lever to apply an additional variable bias on said flapper lever additive to said first mentioned bias and varying with the attitude of the valve-actuating lever, said linkage comprising a throttle lever pivoted to the support, a link pivoted to the said throttle lever and to said flapper lever, and a tension spring extending between the throttle lever and the valve-actuating lever.

10. A proportioning control comprising a support, a valve-actuating lever pivoted to the support, a pair of mutually opposed expansible and contractible power members each respectively mounted on the support and operatively bearing against said lever, a power pressure control system comprising a conduit arranged for association with a source of power pressure and connections to the respective expansible members and including nozzle means, a nozzle flapper lever pivoted to the support, means for biasing the lever in one direction about its pivot, a flapper vane on the flapper lever juxtaposed to the nozzle means, a port element comprising a pressure intake arranged for operative association with a fluid pressure variable, a pressure displaceable control member communicating with and coupled to the port element and mounted for opposition to said bias, varying as a function of the variable pressure in the port element to control the attitude of said flapper lever and flapper relative to said nozzle means, means responsive to the variations in power fluid pressure at the nozzle means for differentially energizing the respective connections to the respective expansible power elements to energize and move said lever, said nozzle means comprising a pair of complemental jets directed at opposite sides of the flapper element and each respectively coupled with the said respective connections to the respective expansible power members so that with asymmetrical disposition of the flapper between the complemental jets the pressure in one expansible power member is higher and the pressure in the other expansible power member is lower than the pressure in both power members when the flapper is symmetrically disposed between the complemental jets, linkage to modify the responsiveness of the flapper to the changes of pressure in said expansible control member comprising a throttling lever pivoted to the support, a link pivoted between the throttling lever and the flapper lever, and a tension spring between the valve-actuating lever and the throttling lever.

11. A proportioning control comprising a support, a valve-actuating lever pivoted to the support, a first power expansible member mounted on the support, a second power expansible member mounted on the support, said power members connected to the lever in mutual opposition, an air relay comprising a control expansible member and a valve moved thereby, a power air connection leading to the valve, separate connections leading from the valve to the respective power expansible members as the only openings therein, said air relay valve leading power air pressure to a selected power expansible member while simultaneously venting the other of said power members or blocking both connections and vice versa in accordance with the setting of the valve as the pressure effective on the control expansible member of the air relay varies, a jet device, means establishing communication between the jet and the air relay control expansible member and a conduit arranged for association with a source of power air pressure, a flapper lever having a flapper juxtaposed to the jet, a port element comprising an intake for operative communication with a pressure variable, as pressure-responsive expansible element communicating with said port element and disposed to apply varying pressure on said flapper lever, spring means applying a bias to said flapper lever in opposition to the pressure from said last mentioned pressure-responsive expansible member, the whole so arranged that fluctuations in pressure on said port vary the attitude of said flapper lever and thus actuate the air relay to apply predetermined differential pressures on the respective power expansible members.

12. A proportioning control comprising a support, a valve-actuating lever pivoted to the support, a first power expansible member mounted on the support, a second power expansible member mounted on the support, said power members connected to the lever in mutual opposition, an air relay comprising a control expansible member and a valve moved thereby, a power air connection leading to the valve, separate connections leading from the valve to the respective power expansible members as the only openings therein, said air relay valve leading power air pressure to a selected power expansible member while simultaneously venting the other of said power members or blocking both connections and vice versa in accordance with the setting of the valve as the pressure effective on the control expansible member of the air relay varies, a jet device, means establishing communication between the jet and the air relay control expansible member and a conduit arranged for association with a source of power air pressure through a restricted internal orifice, a flapper lever having a flapper juxtaposed to the jet, a port element comprising a pressure intake arranged for operative connection with a pressure variable, a pressure-responsive expansible element communicating with said port element and disposed to apply varying pressure on said flapper lever, spring means applying a bias to said flapper lever in opposition to the pressure from said last mentioned line pressure-responsive expansible member, the whole so arranged that fluctuations in pressure on said port vary the attitude of said flapper lever and thus actuate air relay to apply predetermined differential pressures on the respective power expansible members.

13. A proportioning control comprising a support, a valve-actuating lever pivoted to the support, a first power expansible member mounted on the support, a second power expansible member mounted on the support, said power members connected to the lever in mutual opposition, an air relay comprising a control expansible member and a valve moved thereby, a power air connection leading to the valve, separate connections leading from the valve to the respective power expansible members as the only openings therein, said air relay valve leading power air pressure to a selected power expansible member while simultaneously venting the other of said power members or blocking both connections and vice versa in accordance with the setting of the valve as the pressure effective on the control expansible member of the air relay varies, a jet device, means establishing communication between the jet and the air relay control expansible member and a conduit arranged for association with a source of power air pressure, a flapper lever having a flapper juxtaposed to the jet, a port element comprising an intake for operative communication with a pressure variable, a pressure-responsive expansible element communicating with said port element and disposed to apply varying pressure on said flapper lever, spring means applying a bias to said flapper lever in opposition to the pressure from said last mentioned pressure-responsive expansible member, the whole so arranged that fluctuations in pressure on said port vary the attitude of said flapper lever and thus actuate the air relay to apply predetermined differential pressures on the respective power expansible members, and a solenoid-operated valve operative on the air pressure leading to the jet and the whole so arranged that when the jet is deenergized the air relay moves the air relay valve to such position that the valve lever moves to an extreme position to close such supply valve under full instrument pressure in one of said power expansible members.

14. A proportioning control comprising a support, a valve-actuating lever pivoted to the support, a first power expansible member mounted on the support, a second power expansible member mounted on the support, said power members connected to the lever in mutual opposition, an air relay comprising a control expansible member and a valve moved thereby, a power air connection leading to the valve, separate connections leading from the valve to the respective power expansible members as the only openings therein, said air relay valve leading power air pressure to a selected power expansible member while simultaneously venting the other of said power members or blocking both connections and vice versa in accordance with the setting of the valve as the pressure effective on the control expansible member of the air relay varies, a jet device, means establishing communication between the jet and the air relay control expansible member and a conduit arranged for association with a source of power air pressure, a flapper lever having a flapper juxtaposed to the jet, a port element comprising an intake for operative communication with a pressure variable, a pressure-responsive expansible element communicating with said port element and disposed to apply varying pressure on said flapper lever, spring means applying a bias to said flapper lever in opposition to the pressure from said last mentioned pressure-responsive expansible member, the whole so arranged that fluctuations in pressure on said port vary the attitude of said flapper lever and thus actuate the air relay to apply predetermined differential pressures on the respective power expansible members, and a throttling range control-linkage operatively coupled with the valve-actuating lever and the flapper lever to apply an additional bias on said flapper lever varying with the attitude of the valve-actuating lever to reduce the magnitude of flapper-lever movement in response to small variations in supply line pressure.

WILLIAM D. MACGEORGE.

REFERENCES CITED

The following references are of record in the file of this patent:

UNITED STATES PATENTS

| Number | Name | Date |
| --- | --- | --- |
| 2,106,036 | O'Conner | Jan. 18, 1938 |
| 2,125,949 | O'Conner | Aug. 9, 1938 |
| 2,264,262 | Erbguth | Nov. 25, 1941 |